United States Patent [19]

Sasnett et al.

[11] Patent Number: 4,964,735
[45] Date of Patent: Oct. 23, 1990

[54] APPARATUS FOR INDICATING THE POWER AND POSITION OF A LASER BEAM

[75] Inventors: Michael W. Sasnett, Los Altos; Ronald Paitich, Auburn; Edward L. Aurich, Colfax, all of Calif.

[73] Assignee: Coherent, Inc., Palo Alto, Calif.

[21] Appl. No.: 335,000

[22] Filed: Apr. 7, 1989

[51] Int. Cl.$^5$ ............................................. G01K 17/00
[52] U.S. Cl. ...................................... 374/32; 356/121; 250/342; 374/179; 374/141; 33/293; 33/DIG. 21
[58] Field of Search ...................... 374/6, 32, 179, 141, 374/29, 30; 33/293, DIG. 21; 356/400, 121; 250/338.1, 342

[56] References Cited

U.S. PATENT DOCUMENTS

| | | | |
|---|---|---|---|
| 3,305,686 | 2/1967 | Carter et al. | 250/342 |
| 3,596,514 | 8/1971 | Mefferd | 374/32 |
| 3,738,168 | 6/1973 | Mansell | 374/32 |
| 3,792,275 | 2/1974 | Leftwich et al. | 250/342 |
| 3,939,706 | 2/1976 | Pinson | 374/32 |
| 4,035,654 | 7/1977 | Elmer | 250/342 |
| 4,059,359 | 11/1977 | Foster et al. | 374/32 |
| 4,185,497 | 1/1980 | Decker et al. | 374/32 |
| 4,243,888 | 1/1981 | Gruhn et al. | 374/6 |
| 4,309,901 | 1/1982 | Rolinski et al. | 374/29 |
| 4,321,824 | 3/1982 | Martin | 374/32 |
| 4,692,623 | 9/1987 | Roberts et al. | 374/32 |
| 4,742,236 | 5/1988 | Kawakami et al. | 340/578 |
| 4,793,715 | 12/1988 | Kasner et al. | 374/6 |
| 4,840,483 | 6/1989 | Haffner | 356/400 |

OTHER PUBLICATIONS

Foster, T. F. et al., "A New Approach to Laser Beam Heat Flux and Power Profiling," ISA Transactions, vol. 18, No. 4 (1979).

"Bi-Cell and Quadrant Silicon Detectors", Technical Data Sheet, Silicon Detector Corp. (no date).

Data Sheets, Dexter Research Center, Inc., "Models DR26 and DR46 Thermopile Detectors," (Mar. 1985 and Aug. 1986).

Primary Examiner—William A. Cuchlinski, Jr.
Assistant Examiner—Dego F. F. Gutierrez
Attorney, Agent, or Firm—Limbach, Limbach & Sutton

[57] ABSTRACT

An apparatus (12) for providing information about the power and position of a high laser beam includes a heat absorbing body (46) having a target area within which the laser beam is directed. Position information is provided by a plurality of thermocouples (46) connected in series in a circular array and located radially outward of the target area. In the preferred embodiment, the thermocouple array is divided into four quadrants (60-66), each quadrant generating a voltage proportional to the heat flow in the body at that location. A comparison of the voltages generated by each of the quadrants will provide information about the position of the laser beam with respect to the quadrants. In addition, by summing the output of the quadrants, information about the total power of the beam can be derived.

28 Claims, 3 Drawing Sheets

APPARATUS FOR INDICATING THE POWER AND POSITION OF A LASER BEAM

TECHNICAL FIELD

The subject apparatus provides information about the position of a beam.

BACKGROUND OF THE INVENTION

In the prior art, a number of devices have been developed for providing information about the location of a beam of light and particularly a coherent beam of radiation generated by a laser. Information about laser beam position is important for a number of reasons. For example, when a laser delivery system is being assembled or adjusted, knowledge of the beam position is necessary to permit the alignment of the beam with respect to the delivery optics. Proper alignment is critical to the performance of the delivery system. Laser beam position information is also important in devices where the movement of the beam plays a part in making test measurements. For example, certain laser test devices cause a beam to be reflected off a sample. Changes in the position of the reflected beam can be used to gain information about various surface characteristics of the object.

The principal devices found in the prior art for detecting the position of laser beams are silicon based photodetectors. Silicon photodetectors are designed to generate a voltage based on the light that falls on the detector surface. A standard, single element photodetector can provide information about the intensity of the beam. Position of the beam within the surface of the detector requires that the detector surface be divided into sections. The standard devices for this purpose fall primarily into two classes; specifically bi-cell and quadrant photodetectors.

A bi-cell detector includes two detector elements separated by a central linear gap. When a laser beam is perfectly centered on a bi-cell detector, the output from both sides of the detector will be equal. If, however, the beam moves more to one side of the detector than the other, the output voltage from the two sides will be different. The voltage difference can be used to determine the position of the beam along one axis. Quadrant detectors are similar to bi-cell detectors except that the detector surface is broken into four radial quadrants each generating independent voltage information. The independent voltage levels from the four radial quadrants allows both the X and Y position of a laser beam to be derived.

Quadrant and bi-cell silicon photodetectors have been successfully used to measure low-power visible laser beams. Unfortunately, normal silicon based devices cannot be used for the long infrared wavelengths generated by, for example, $CO_2$ lasers. This is a critical problem since the infrared beams are invisible to the human eye. Therefore, some method must be provided to permit alignment of these beams.

In the prior art there have been developed some cryogenically cooled detectors for indicating the position of a far infrared laser beam. Unfortunately, these devices are expensive and, like the silicon detectors, are only suitable for use with low power beams. Specifically, silicon photodetectors and the cryogenically cooled detectors operate in power ranges under a watt.

Today there are a large variety of commercially available lasers which generate laser beams far in excess of a watt. Ion lasers generate visible beams over 20 watts. Similar powers are generated by commercially available YAG lasers. Industrial $CO_2$ lasers generate beams having power outputs measured in the kilowatt range. None of the position detecting sensors found in the prior art can handle these high power beams.

Since there are no suitable position detecting devices for high power infrared beams, designers of industrial lasers must resort to crude techniques for aligning the optical elements in a beam delivery system. For example, a thin piece of wood will be moved by hand into the general area of the beam path. The beam will burn the wood giving the technician information about the position of the beam. The delivery optic can then be approximately aligned based on this crude information. These steps are performed for each optic between the laser output and the final lens used to focus the beam on the workpiece. As can be appreciated, this approach is both dangerous and not particularly accurate. It would be desirable to provide a beam position detector which could be used to align beam delivery optics for high power laser systems.

In the late 1960's, as the power of commercial lasers was being increased, not only was there a lack of position detectors, but there was a lack of a good meter to provide a measurement of the output power of the beam. A significant amount of effort was expended to develop meters which would measure high power laser beams. One solution is described in U.S. Pat. No. 3,596,514 issued Aug. 3, 1971 to Mefferd, et al. and assigned to the assignee of the subject invention and incorporated herein by reference.

In the latter device, a thermally conductive planar disk is mounted in a structure for dissipating heat. The disk includes a plurality of thermocouples connected in series to define a thermopile. The thermopile is arranged in a circular array about a target area upon which the laser beam is focused. As the laser beam heats the disk, the thermopile will generate a voltage proportional to the power level of the beam. The voltage is supplied to a meter which is calibrated to display the power of the beam in watts.

The commercial embodiment of the power meter described in the latter patent has been successfully sold by the assignee herein for the last 20 years. One advantage of the thermocouple array is that the device is relatively insensitive to the position of the beam on the disk. More specifically, since the thermocouples are connected in series, the voltage generated represents the total heat absorbed by the disk, and therefore will be substantially independent of beam position.

The disks utilized in the commercial embodiment of the meter disclosed in U.S. Pat. No. 3,596,514 are covered with a highly absorptive black coating material. It has been found that after prolonged use with high-power laser beams, the surface coating will sometimes become bleached or otherwise affected. This degradation can create some difficulties in obtaining reproducible power measurements. For example, if an area on the detector is bleached to some degree, a visible beam focused on that area will be partially reflected. If part of the beam is reflected, less energy is absorbed than if the beam was focused on an undamaged area. Accordingly, if some bleaching has occurred, it is necessary to align the beam at the same spot on the detector to obtain consistent readings from one measurement to the next. However, positioning of the beam at the same spot by eye can be difficult with bright laser beams. Accordingly, customers who wanted to insure reproducible results have had to recoat the surface of the detector at periodic intervals to remove the bleaching effect. It would be desirable to develop a product which did not have to be recoated to avoid this problem.

Accordingly, it is an object of the subject invention to provide a power meter which can also give information about the location of the beam on the surface of the detector.

It is another object of the subject invention to provide an apparatus for generating information about the position of high power laser beam.

It is a further object of the subject invention to provide a new and improved power meter which can generate information both as to the power level of the beam and the beam position.

It is another object of the subject invention to provide an apparatus for locating the position of infrared laser beam.

It is still a further object of the subject invention to provide an apparatus which can generate a real time display indicating the position of a laser beam on a detector.

It is still another object of the subject invention to provide a power meter having a longer lifetime.

It is still a further object of the subject invention to provide a device capable of generating information about the position of a laser beam which functions over a wide range of wavelengths and beam powers.

SUMMARY OF THE INVENTION

In accordance with these and many other objects, the subject invention includes a heat absorbing body in the form of a disk which acts as the target area for focusing a laser beam. A plurality of thermocouples are formed on one surface of the body in a substantially circular array and located radially outward of the target area. These thermocouples are divided into a plurality of groups with the thermocouples in each group being connected in series to define a thermopile.

In the preferred embodiment, the thermocouples are divided in four groups and arranged in four quadrants about the circular array. Each of the groups of thermocouples will provide an output voltage proportional to the heat absorbed in the body. By arranging the groups in a quadrant fashion, information about the position of the beam can be obtained. More particularly, if the beam is centered within the target area, the voltage generated in each of the groups should be equal. If, however, the beam is not focused in the center of the target area, the voltages generated by each quadrant will not be the same. A processor can be provided to convert the differing voltages measured into X and Y position coordinates with respect to the center of the target area. This information can be displayed to provide real time visual feedback of the position of the beam.

In one embodiment of the subject invention, the thermopile design of the prior art detector is modified in order to provide positional information in a power meter. In an alternative embodiment, the new thermopile construction is implemented in a water-cooled structure which is designed to be easily installed in place of laser beam delivery optics. This design allows the alignment of the optics in a beam delivery system to be simplified.

Further objects and advantages of the subject invention will become apparent from the following detailed description taken in conjunction with the drawings in which:

DETAILED DESCRIPTION OF THE PREFERRED EMBODIMENTS

Figure 1:
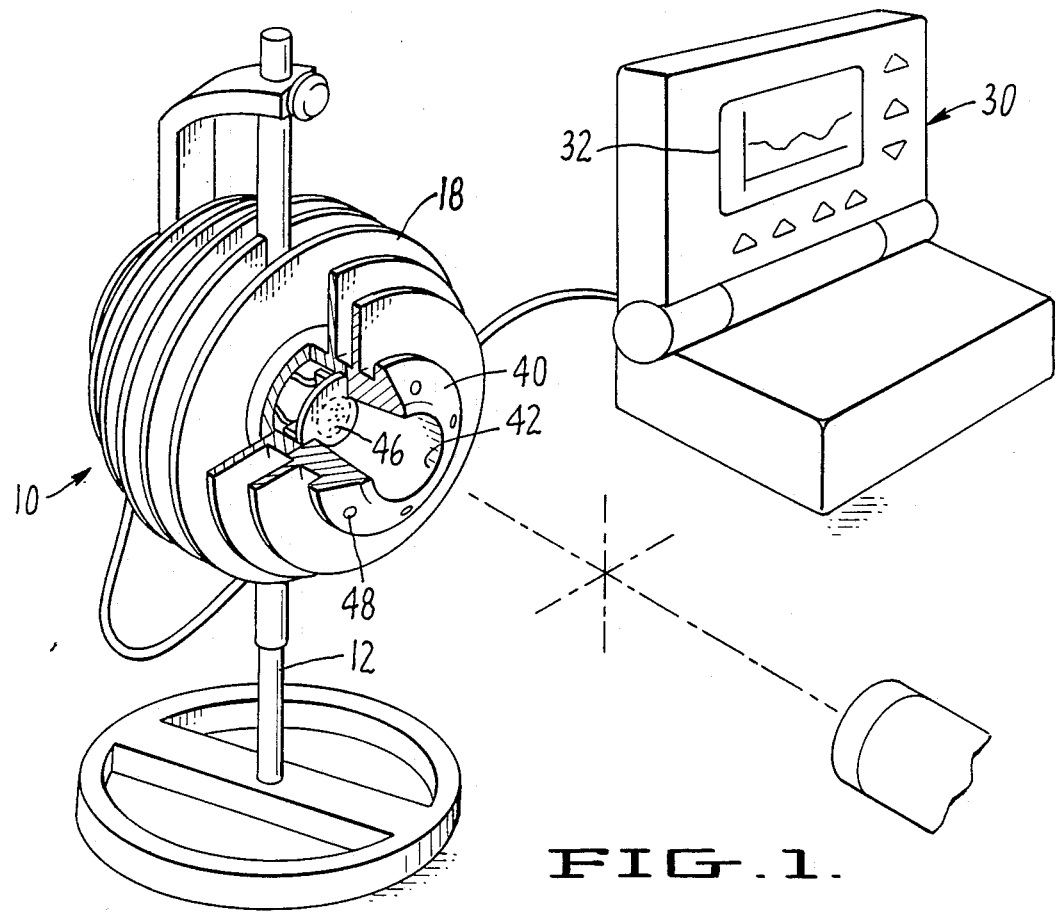
FIG. 1 is a perspective view of the new and improved power meter for generating information about the position of the beam along with a device for processing the output voltages and displaying information about the position of the beam.
Figure 2:
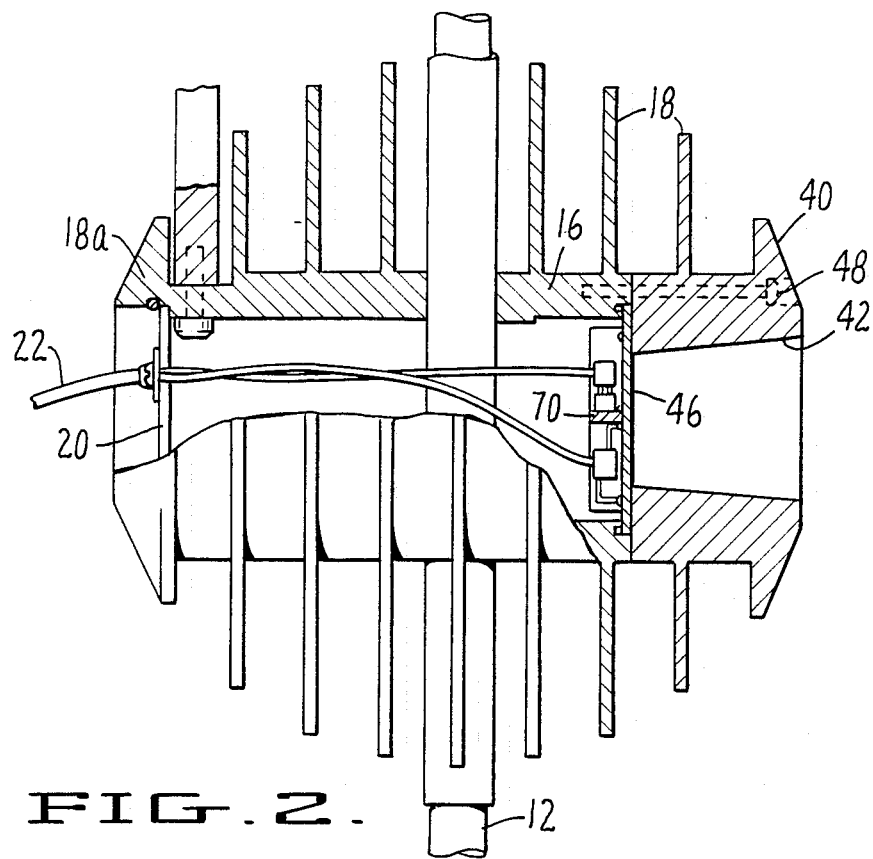
FIG. 2 is a cross sectional view of the apparatus of FIG. 1.

Referring to FIGS. 1 and 2, there is illustrated the new and improved apparatus 10 of the subject invention. The apparatus 10 is mounted on a support stand 12 in a manner to be freely movable both vertically and circumferentially around the axis of stand 12. The apparatus 10 includes a cylindrical core 16 formed from a high thermal conductivity material such as aluminum. A plurality of cooling vanes 18 are connected to the inner core 16 similar to the cooling vanes disclosed by Mefferd et al., cited above.

End vane 18A contains a dielectric coated disk acting as a base for the connection of electric cable 22. Cable 22 leads to a read-out device 30 which includes a microprocessor and a LCD display 32 shown in greater detail on FIG. 5.

On the front end of core 16 there is provided a threaded cap 40 having a central channel 42 that allows radiation from the laser source 44 to reach the target disk 46. Threaded cap 40 also includes cooling vanes 18 as shown in FIG. 2. A plurality of bolts 48 are provided to hold the cap 40 in place against disk 46.

Disk 46 is preferably made from a material having a high thermal conductivity such as aluminum. The side of the disk facing the laser 44 is typically coated with a material to maximize absorption.

Figure 3:
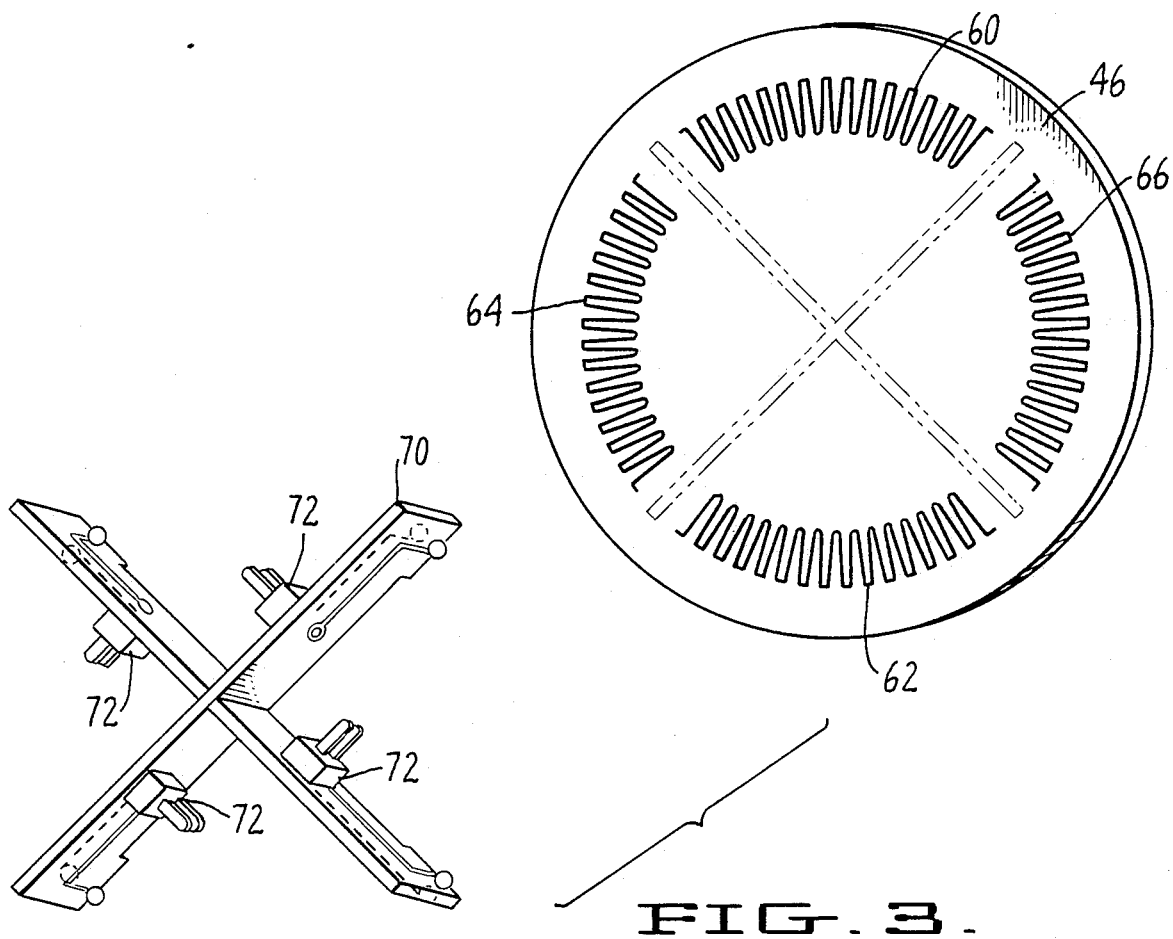
FIG. 3 is an exploded view of the heat absorbing disk of the subject invention showing the thermocouple array formed thereon.
Figure 4:
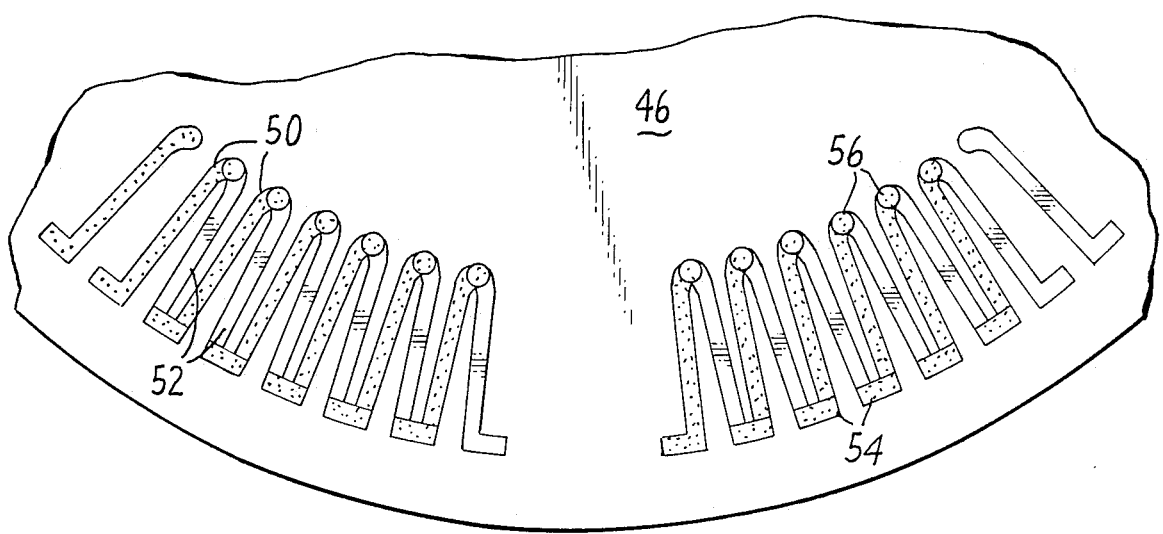
FIG. 4 is a partial enlarged plan view of the disk of FIG. 3.

Referring to FIGS. 3 and 4, there is illustrated the thermopile arrangement formed on the rear side of disk 46. While the thermopile arrangement is shown on the rear side, it is possible to form this array on the front side.

The thermopile array consists of individual thermocouples each defined by a pair of conductors formed from different materials. In the preferred embodiment, the thermocouples consist of a plurality of first conductive elements 50 formed from silver. Each thermocouple also includes a second conductor 52 formed from bismuth. Other choices of materials for the two distinct conductor elements are available.

The thermocouples are connected in series, with one end of the first connector being connected to the one end of the second conductor to define a thermopile arrangement. At each connector juncture, an electromotive force will be developed in response to heat flow. The electromotive force at the radially outer connection points 54 will be of opposite sign compared to the electromotive force at the radially inner connecting points 56. However, because the heat will be greater on the radially inner thermocouple connections, a voltage differential will be developed which is additive and can be measured.

In the assignee's previous power meter, the thermocouples were laid out in one continuous concentric array. The output voltage from this array provided information about the power of the laser beam striking the disk. In accordance with the subject invention, the improved array not only provides information about the power of the beam, but also provides information about the position of the beam within the target area.

The latter result is achieved by dividing the thermopile array into a plurality of groups. As illustrated in FIG. 3, in the preferred embodiment, there are four groups, including an upper quadrant 60, a lower quadrant 62, a left quadrant 64 and a right quadrant 66. Each of the quadrant thermopiles will produce a voltage output proportional to the heat in that quadrant. As discussed below, in a calculation process similar to that used in quadrant silicon photodetectors, the position of the beam can be determined.

To facilitate the connection of leads from each thermopile group, a plastic circuit board 70 can be provided. Leads (not shown) running from the ends of the thermopile arrays 60 through 66 can be connected to more sturdy connectors 72 mounted on circuit board 70. A set of four 2-wire connectors are then connected from the connectors 72 to the back of disk 20.

As noted above, cable 22 is connected to a device 30 for processing the voltage outputs from the apparatus 10. As with the prior art meter, information about the total power of the beam can be derived. This measurement is derived by summing the total of the voltages generated in each of the quadrants. This voltage is then multiplied by a calibration factor to produce the power output of the beam.

Figure 5:
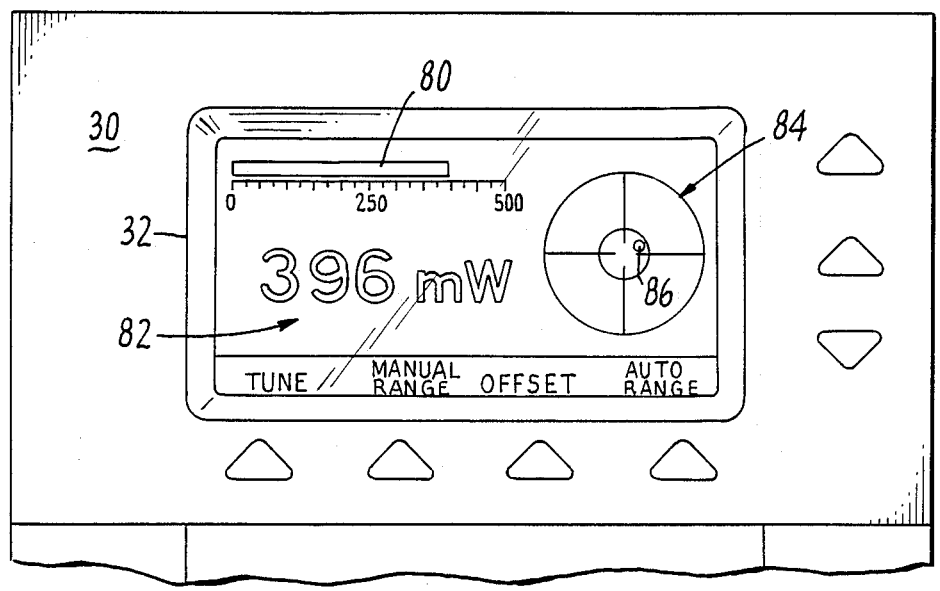
FIG. 5 is a view of the display screen utilized to indicate position of the beam in accordance with the subject invention.

In the preferred embodiment, each quadrant is calibrated after fabrication. A constant is derived relating voltage generated by the thermocouples to beam power. This constant is stored in a PROM associated with the detector head. Thus, the signal delivered to device 30 by cable 22 represents the beam power absorbed by each quadrant. The processor in device 30 functions to sum these outputs to derive the total power of the beam. As illustrated in FIG. 5, the total beam power can be displayed using a bar graph 80 and/or a straight numerical digital readout 82 of the LCD display.

In addition to measuring power of the beam, the position of the beam is calculated and displayed on a coordinate system 84. In order to derive the information for this display, the processor in the device 30 will calculate the cartesian coordinates of the beam on the target area using the following equations:

$$X \text{ position} = \frac{(\text{right quad } pwr - \text{left quad } pwr)}{(\text{total power})} \times K \quad (1)$$

$$Y \text{ position} = \frac{(\text{lower quad } pwr - \text{upper quad } pwr)}{(\text{total power})} \times K \quad (2)$$

where K is a constant obtained by multiplying the diameter of the graphical display in pixels by a position sensitivity constant associated with the detector. In the preferred display, 80 pixels are used. The position sensitivity constant is derived during initial calibration and can be stored in the PROM associated with the detector head. By using these constants, the beam position can be mapped on the display such that when the beam is on the outer edge of the target area, it will be displayed on the outer edge of the display. Beam locations between the center point and the outer edge will be proportionally mapped on the display.

The total power data used in equations (1) and (2) represents the sum of the four quadrants as discussed above. The differences in the quadrant powers are divided by the total power in the equations in order to normalize the position information such that it will be independent of beam power.

As can be appreciated, when the beam is in the center of the target zone, the solution of both Equations 1 and 2 will be zero. In this case, a spot is displayed with the cartesian coordinate 0,0 on screen 84. If the laser beam is not centered on the target area, the solutions of Equations 1 and 2 will provide cartesian coordinates that correspond to the distance and direction the beam is offset from the center position. A spot 86 can then be placed at the appropriate location on the display 84 as shown in FIG. 5.

The detector and display device described above have been found to be extremely useful for monitoring both the power and position of a laser beam. Since the output voltage is generated in response to absorption of heat, the detector is operative over a wide range of laser wavelengths. In addition, the detector can be used with lasers having beams ranging in power from a few miliwatts to multikilowatts. As noted above, there is no prior art device which can generate position information for high power beams.

When the subject invention is incorporated with a prior art power meter, the life of that meter can be extended since it is easy for the user to position the beam at the same location for each test. By insuring that the beam strikes the same spot on the target, the reproducibility of the results is improved without having to recoat the disk.

Figure 6:
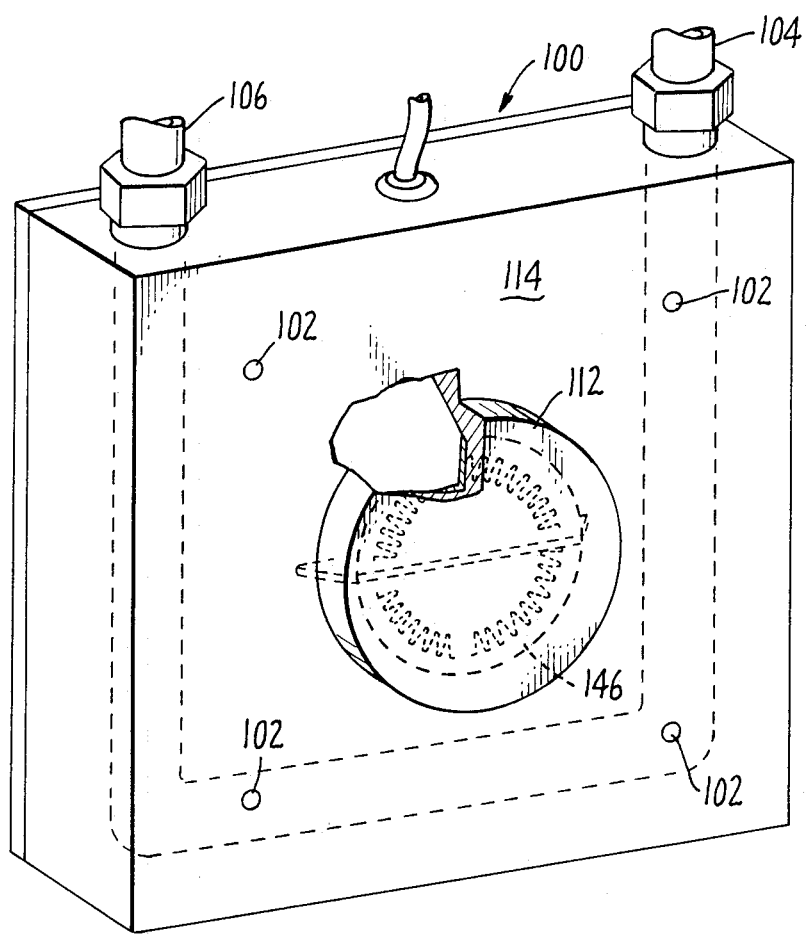
FIG. 6 is a perspective view of an alternate embodiment of the apparatus of the subject invention particularly suited for mounting as a replacement for a beam delivery optic.

The subject invention can also be adapted for use in a device which can be mounted in place of an optical element in a laser beam delivery system. FIG. 6 illustrates such a structure. Device 100 includes a target disk 112 whose construction is operatively identical to the structure described with reference to FIGS. 3 and 4. Thus, in accordance with the subject invention, disk 112 includes a thermopile array 146 divided into four quadrants.

The disk 112 is formed integrally with a base 114 which is designed to be readily connectable to a mirror mount of the type used in various beam delivery assemblies that are a normal part of an industrial laser material processing system. Apertures 102 are provided in base 114 to receive screws for mounting adaptor plates that, in turn attach to mirror mounts. Disk 112 is raised to retain the position height of a corner mirror mount.

Because this unit must be relatively compact to be mounted in a delivery system, a water cooling system is included rather than the cooling vanes described with respect to the first embodiment. The water cooled system includes water inlet 104 an outlet 106 for circulating water through channel 108. This particular embodiment requires a water flow of 1 gal/min. Cable 122 is provided for supplying the voltages generated by the thermopile to 146 to a device 30 as described with reference to the first embodiment.

In use, the subject detector head 100 is used to replace the mirror closest to the laser and the beam is centered based on the position information provided by display 84. The device is then moved from the closest mirror outwardly and placed at the various mirror locations along the beam delivery system such that the beam can be quickly and accurately centered, minimizing delivery losses and maximizing accuracy of delivery location. The detector head 100 can also be used to provide information about the total power of the beam at each mirror location by summing the thermocouples as described above.

In summary, there has been provided a new and improved apparatus for providing information about the position of a laser beam. The apparatus includes a heat absorbing body having a target area within which the laser beam is directed. A means is provided for cooling the heat absorbing body. Position information is provided by a plurality of thermocouples connected in series in a circular array and located radially outward of the target area. In the preferred embodiment, the thermocouple array is divided into four quadrants, each quadrant generating a voltage proportional to the heat in the body at that location. A comparison of the voltages generated by each of the quadrants will provide information about the position of the laser beam with respect to the quadrants. In addition, by summing the output of the quadrants, information about the total power of the beam can be derived.

While the subject invention has been described with reference to the preferred embodiments, various other changes and modifications can be made therein by one skilled in the art without varying from the scope and spirit of the subject invention as defined by the appended claims.

We claim:

1. An apparatus for providing information about the position of a laser beam comprising:
a heat absorbing body having a uniform target area within which the laser beam is directed; and
a plurality of thermocouples formed on said body and divided into at least two groups with each group having at least two thermocouples, said thermocouples for generating a voltage proportional to the heat flow in the body absorbed from the laser beam such that the summation of the voltages of each individual group of thermocouples will be proportional to the total power of the beam and whereby a comparison of the voltages generated by each individual group of thermocouples will provide information about the position of the laser beam with respect to the orientation of said groups.

2. An apparatus as recited in claim 1 wherein the thermocouples in each group are connected in series to defined a thermopile.

3. An apparatus as recited in claim 1 wherein said thermocouples are formed in a substantially circular array and located radially outward of said target area.

4. An apparatus as recited in claim 3 wherein said thermocouples are divided into four equal groups positioned in four quadrants in the circular array.

5. An apparatus as recited in claim 1 further including means for mounting said heat absorbing body in a manner to replace an optical element in a laser delivery system.

6. An apparatus as recited in claim 1 wherein said heat absorbing body is formed from a material having high thermal conductivity.

7. An apparatus as recited in claim 1 further including a means for cooling the heat absorbing body.

8. An apparatus as recited in claim 7 wherein said cooling means is defined by a plurality of cooling vanes.

9. An apparatus as recited in claim 7 wherein said cooling means includes a means for channeling a liquid coolant in a manner to remove heat from said body.

10. An apparatus as recited in claim 1 wherein each said thermocouple is defined by first and second electrical conductors formed from different materials.

11. An apparatus as recited in claim 10 wherein said first conductors are formed from silver and said second conductors are formed from bismuth.

12. An apparatus as recited in claim 1 further including a processor means for calculating the position of the laser beam within the target area based on the voltages generated by the groups of thermocouples.

13. An apparatus as recited in claim 12 further including a display means connected to said processor means, said display means for providing a visual indication of the location of the laser beam within the target area.

14. An apparatus as recited in claim 13 wherein the center of the display means corresponds to the center of the target area, and wherein points on the display spaced from the center correspond in direction and distance to points within the target area, with the position of said beam being indicated as a spot on said display.

15. An apparatus as recited in claim 12 wherein said processor means further functions to sum the signals representative of the voltages generated by the groups of thermocouples in order to calculate the total power of the laser beam striking the target area.

16. An improved meter for measuring the power of a laser beam, said meter including a heat absorbing body having a uniform target area within which the beam is directed, said meter further including a circular array of thermocouples arranged radially outside the target area, said thermocouples for generating an output voltage in response to heat flow in the body generated from the laser beam, said output voltage being proportional to the total power of the beam, the improvement for providing information about the position of the laser beam within the target area, said improvement comprising:
means for detecting the heat flow generated by the laser beam striking the target area with respect to the position of the thermocouples in said circular array wherein the position of the laser beam is determined by comparing the output voltage generated by the thermocouples.

17. A meter as recited in claim 16 wherein said means for detecting heat flow with respect to the position of the thermocouples in the circular array comprises:
at least two groups of thermocouples, each group having at least two thermocouples, with each of the thermocouples in said groups being connected in series whereby a comparison of the voltages generated by each individual groups of thermocouples will provide information about the position of the laser beam with respect to the orientation of said groups.

18. An apparatus as recited in claim 17 wherein said thermocouples are divided into four equal groups positioned in four quadrants in the circular array.

19. An apparatus as recited in claim 16 wherein said heat absorbing body is formed from a material having high thermal conductivity.

20. An apparatus as recited in claim 16 further including a means for cooling the heat absorbing body.

21. An apparatus as recited in claim 20 wherein said cooling means is defined by a plurality of cooling vanes.

22. An apparatus as recited in claim 20 wherein said cooling means includes a means for channeling a liquid coolant in a manner to remove heat from said body.

23. An apparatus as recited in claim 16 wherein each said thermocouple is defined by first and second electrical conductors formed from different materials.

24. An apparatus as recited in claim 23 wherein said first conductors are formed from silver and said second conductors are formed from bismuth.

25. An apparatus as recited in claim 16 further including a processor means for calculating the position of the laser beam within the target area based on the voltages generated by the groups of thermocouples.

26. An apparatus as recited in claim 25 further including a display means connected to said processor means, said display means for providing a visual indication of the location of the laser beam within the target area.

27. An apparatus as recited in claim 26 wherein the center of the display means corresponds to the center of the target area, and wherein points on the display spaced from the center correspond in direction and distance to points within the target area, with the position of said beam being indicated as a spot on said display.

28. An apparatus as recited in claim 25 wherein said processor means further functions to sum the signals representative of the voltages generated by the groups of thermocouples in order to calculate the total power of the laser beam striking the target area.

* * * * *

UNITED STATES PATENT AND TRADEMARK OFFICE
CERTIFICATE OF CORRECTION

PATENT NO. : 4,964,735

DATED : October 23, 1990

INVENTOR(S) : Michael W. Sasnett; Ronald Paitich; and Edward L. Aurich

It is certified that error appears in the above - identified patent and that said Letters Patent is hereby corrected as shown below:

Title page, item [75] Inventors:

"INVENTORS", change "Michael W. Sasnett, Los Altos; Ronald Paitich, Auburn; Edward L. Aurich, Colfax" to --Michael W. Sasnett, Los Altos; Ronald Paitich, Auburn; Edward L. Aurich, Colfax; Robert J. Rorden, Los Altos--.

Signed and Sealed this

Twenty-eighth Day of July, 1992

Attest:

DOUGLAS B. COMER

*Attesting Officer*     *Acting Commissioner of Patents and Trademarks*